No. 798,062. PATENTED AUG. 29, 1905.
A. E. HOBSON & J. G. BROWN.
INSULATED HANDLE.
APPLICATION FILED JUNE 28, 1904.
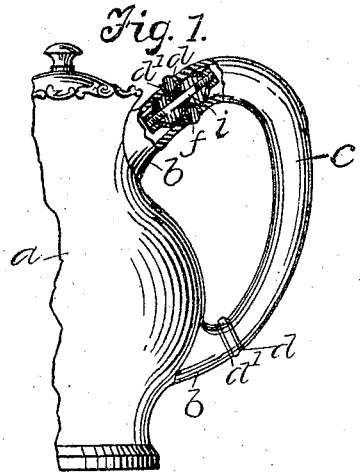
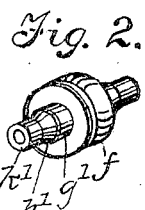
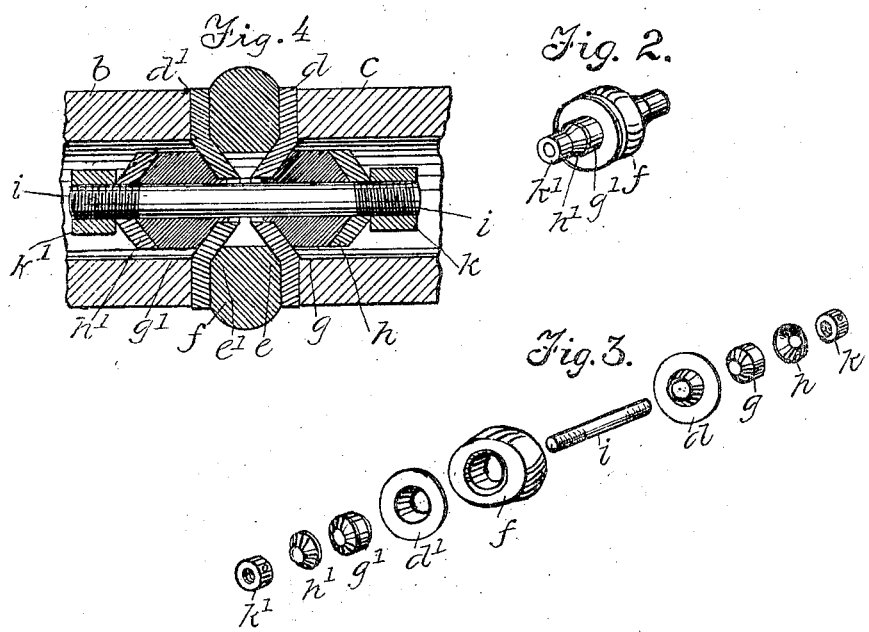
Witnesses:
Clara E. Johnson
Lena O. Berkovitch
Inventors
Arthur E. Hobson
John G. Brown
by Jenkins H. Barker
Attorneys

UNITED STATES PATENT OFFICE.

ARTHUR E. HOBSON AND JOHN G. BROWN, OF MERIDEN, CONNECTICUT; SAID BROWN ASSIGNOR TO SAID HOBSON.

INSULATED HANDLE.

No. 798,062.　　　Specification of Letters Patent.　　　Patented Aug. 29, 1905.

Application filed June 28, 1904. Serial No. 214,499.

*To all whom it may concern:*

Be it known that we, ARTHUR E. HOBSON and JOHN G. BROWN, citizens of the United States, and residents of Meriden, in the county of New Haven and State of Connecticut, have invented a new and Improved Insulated Handle, of which the following is a specification.

Our invention relates more especially to the class of devices used for preventing the transmission of heat from a vessel to the handle thereof; and the object of our invention is to provide a device of this class that shall prevent the grip of the handle from becoming heated, and especially one in which the joint between the grip and the tangs to which it is secured shall be extremely strong and requisite to withstand the strains to which the vessel shall be subjected in use.

One form of device embodying our invention and illustrating the physical embodiment thereof is illustrated in the accompanying drawings, in which—

Figure 1 is a view in side elevation of a portion of a vessel, having a handle provided with our insulated device. Fig. 2 is a perspective view of the parts containing the insulation. Fig. 3 is a perspective view of said parts, shown as separated. Fig. 4 is a detail view, on enlarged scale, showing a tang and grip connected by our insulated device.

In the accompanying drawings the letter $a$ denotes a vessel, as a teapot or the like, and $b$ tangs secured thereto in any suitable manner. These tangs may be integral with the pot or may be separate structures permanently and strongly secured thereto. The letter $c$ denotes the grip, which forms the handle of the vessel.

Between each end of the grip and the tangs our insulated device is interposed, and this insulation consists of the following elements: Two metallic plates $d\ d'$, of a metal harder than that of which the grip and tangs are composed, are constructed to conform to the cross-sectional shape of the handle to be secured, the plate $d'$ fitting the tang and the plate $d$ fitting the grip. An opening is formed centrally through each of these plates and centrally of the plates, and about the openings they are formed into cone-shaped projections $e\ e'$. It is of importance that the metal composing the plates and that composing the grip and tang shall be of different degrees of hardness in order that the material (not shown) used to secure the two parts together shall properly fuse to provide an extremely-tight joint and one capable of withstanding all the strains to which the vessel shall be subjected when in use.

A ring $f$ is located between the plates $d\ d'$, and this ring is composed of any suitable heat-non-conducting material. A secondary insulation is interposed between the tangs and grip, and this secondary insulation consists of pieces $g\ g'$, composed of suitable heat-non-conducting material. These secondary insulations are cone-shaped on opposite sides, the cone on one side being adapted to fit the cone-shaped recesses in the plates $d\ d'$. On the opposite sides and on the cone-shaped surface of these secondary insulations are plates $h\ h'$, shaped to fit the cone-shaped surface of the secondary insulation. A threaded tie $i$ extends through all of the parts above described, this tie being composed, preferably, of a rod of metal threaded at opposite ends and bearing nuts $k\ k'$, fitted upon the threaded outer ends of the tie and adapted to close the several parts together. The plates $h\ h'$ may also be threaded, if desired, to fit the threaded end of the tie. It will be noted, as plainly shown in Fig. 4 of the drawings, that this tie is of such size that there is a free space entirely around it between its outer surface and the inner surface of the openings through the disks $d\ d'$, so that there is absolutely no metallic connection between the tang $b$ and the joined end of the grip $c$.

It may be noted from the above description that the insulated joint is of particularly strong construction and that there is absolutely no metallic connection between the grip and the tang to which it is secured. The construction of the several parts with cone-shaped projections and recesses accurately fitting each other tend to draw the parts to the center, which is a desirable form of construction in that the parts are self-centering in the operation of tying or securing them together, and the secondary insulation provides additional means for preventing the transmission of heat between the parts.

It is obvious that the details of construction herein described may be departed from to a considerable extent without avoiding the invention, and we do not desire to limit ourselves to the exact features herein set out, as the cone construction may be departed from to a considerable extent without avoiding the invention.

What we claim as our invention, and desire to secure by Letters Patent, is—

1. In an insulated handle including handle-sections to be joined, plates interposed between said sections means for securing the plates to the handle-sections an insulation including a piece of insulated material inserted between said plates, said plates and insulated piece having centrally-located interengaging cone-shaped recesses and projections, and means for securing the parts together.

2. In an insulated handle including handle-sections to be joined, an insulation including metallic plates secured to said sections means for securing the plates to said sections, an insulated material secured between the plates, a secondary insulation located at the other side of each of said plates, and means for securing said parts together.

3. In an insulated handle including handle-sections to be joined, an insulation including metallic plates secured to the joined sections means for securing the plates to said sections, insulated material interposed between the plates, secondary insulations included in the structure, said insulations and plates being provided with centrally-located cone-shaped recesses and projections accurately fitting each other, and means for joining the parts together.

4. In an insulated handle including handle-sections to be joined, an insulation including plates secured to the joined sections means for securing the plates to said sections, insulated material interposed between said plates, insulation-pieces located on the opposite sides of said plates, a tie-rod extending through the insulations but separated from the metallic plates by a space between said rod and plates, and means for securing the tie-rod in position.

5. In an insulated handle including handle-sections to be joined, metallic plates secured to each of said sections means for securing the plates to said sections, insulating material interposed between the metallic plates, insulating-pieces located on the opposite sides of said metallic plates, said plates and insulating-pieces having centrally-located interengaging cone-shaped projections and recesses, a tie-rod extending through said plates and insulated pieces but entirely disconnected from said metallic plates, and means for securing said tie-rod to bind the parts together.

6. In an insulated handle including handle-sections to be joined, an insulation including metallic plates secured to said sections means for securing the plates to said sections, an insulated material secured between the plates, said plates having centrally-located cone-shaped recesses, a tie-rod extending through said plates but separated therefrom by a space, pieces having cone-shaped projections fitting the cone-shaped recesses in said plates, and means for securing the tie-rod.

7. In an insulated handle including handle-sections to be joined, an insulation including metallic plates to be secured to said handle-sections means for securing the plates to said sections, secondary insulations located on the opposite sides of said plates and separated from the handle-sections by a space extending therearound, said plates and insulations having centrally-located cone-shaped recesses and projections fitting therein, a tie-rod extending through said plates and insulations and separated from the metallic plates by a space extending completely around the tie-rod, and means for securing the tie-rod in position.

8. In an insulated handle including handle-sections to be joined, metallic plates secured to said sections, means for securing the plates to said sections, and an insulation including an insulating-piece interposed between said plates with a space between the inner edges of said parts, said plates and insulating-piece having centrally-located, interengaging, cone-shaped recesses and projections, and means spaced from said parts for securing them together.

9. In an insulated handle including handle-sections to be joined, plates interposed between said sections, means for securing the plates to the handle-sections, and an insulation including an insulating-piece located between the plates, secondary insulation located on the other side of each of the plates, means for securing said parts together, said insulation having spaces between the parts, and centrally-located, interengaging, cone-shaped recesses and projections on the parts.

ARTHUR E. HOBSON.
JOHN G. BROWN.

Witnesses:
J. L. DALGLEISH,
SUSIE JACKSON.